United States Patent [19]

Balmer

[11] Patent Number: 5,641,026
[45] Date of Patent: Jun. 24, 1997

[54] FRAME FOR AGRICULTURAL CULTIVATOR

[76] Inventor: Charles Balmer, Box 34, Elie, Manitoba, Canada, R0H 0H0

[21] Appl. No.: 576,986

[22] Filed: Dec. 26, 1995

Related U.S. Application Data

[63] Continuation-in-part of Ser. No. 307,258, Sep. 16, 1994, Pat. No. 5,524,712.
[51] Int. Cl.$^6$ .................................................. A01B 73/00
[52] U.S. Cl. ........................... 172/452; 172/286; 172/311
[58] Field of Search ................................. 172/310, 311, 172/196, 219, 452, 456, 286, 724, 740, 776, 720, 287

[56] References Cited

U.S. PATENT DOCUMENTS

| | | |
|---|---|---|
| 2,735,251 | 2/1956 | Dlugosch . |
| 2,889,890 | 6/1959 | Brodeeve . |
| 3,054,462 | 9/1962 | Anderson . |
| 3,935,696 | 2/1976 | Pavel . |
| 4,293,043 | 10/1981 | Newkom et al. . |
| 4,418,762 | 12/1983 | Page . |
| 4,502,545 | 3/1985 | Cousen . |
| 5,191,942 | 3/1993 | Bussiere . |
| 5,524,712 | 6/1996 | Balmer .................................. 172/311 |

FOREIGN PATENT DOCUMENTS

| | | |
|---|---|---|
| 1099566 | 4/1981 | Canada . |
| 1267318 | 4/1990 | Canada . |

OTHER PUBLICATIONS

John Deere Brochure entitled Seed Bed Tillage Equipment—1060 Field Cultivator, pp. 6 and 7 (no date).
Brochure of Morris Industries of Yorkton, Saskatchewan, Canada, p. 12—Magnum II CP-709 Chisel Plow Three Point Hitch (no date).
Brochure of Western Manufacturing (4 pages) (no date).

*Primary Examiner*—Terry Lee Melius
*Assistant Examiner*—Robert Pezzuto
*Attorney, Agent, or Firm*—Adrian D. Battison; Murray E. Thrift

[57] ABSTRACT

An agricultural cultivator includes a single elongate tubular tool bar of circular cross section which is split into a center section and two wing sections interconnected with the center section at outer ends thereof through pivot couplings. The center section of the tool bar is mounted on two ground wheels and the outer end of each wing section is mounted on a respective one of a pair of ground wheels. Each ground wheel is connected to the tool bar by a respective brace. The ground wheels are aligned so that there axes of rotation lie on a common line forwardly of the tool bar. The braces are interconnected with a hitch frame for pivotal movement relative to the hitch frame about pivot pins defining a common pivot axis parallel to the tool bar and located between the tool bar and the common line of the ground wheels so that rotation of the braces causes the tool bar to move forwardly while the ground wheels move rearwardly under the toolbar. The rotation of the tool bar through approximately 90° lifts the cultivator shanks mounted on individual tool frames carried from the tool bar so that the tool frames stand vertically upwardly from the tool bar in a transport position. Each shank is formed from a flat plate lying in a vertical plane engaged in a slot in an angled pulling plate and carries a transverse rod which engages the plate so that the shank can tilt side to side to accommodate obstacles.

23 Claims, 11 Drawing Sheets

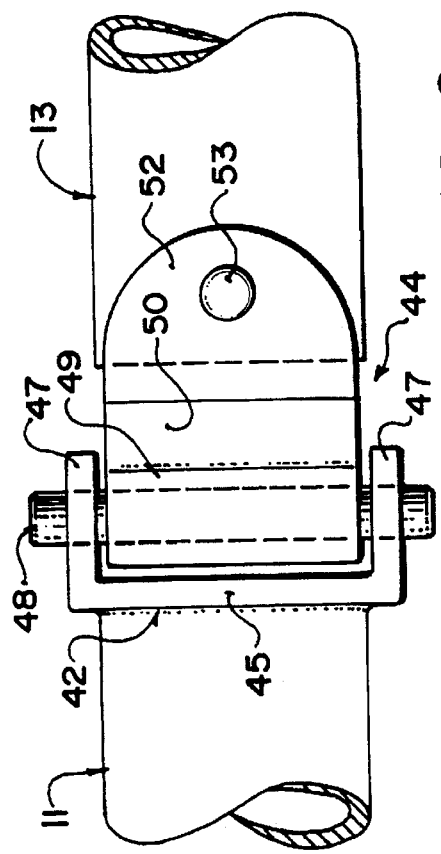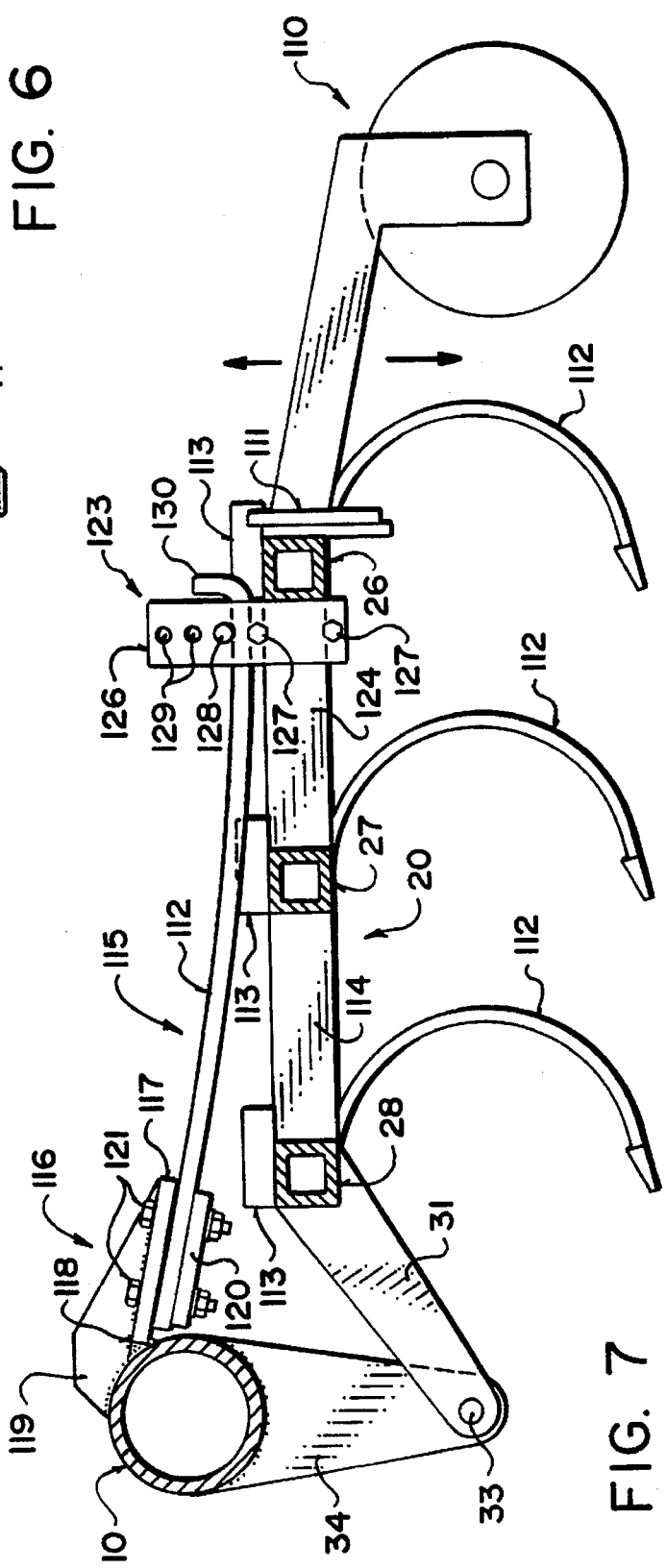

FRAME FOR AGRICULTURAL CULTIVATOR

This application is a continuation-in-part of application Ser. No. 307,258 filed Sep. 16, 1994, now U.S. Pat. No. 5,524,712, issued Jun. 11, 1996.

BACKGROUND OF THE INVENTION

This invention relates to an agricultural frame for transporting ground working tools and particularly to a frame for a cultivator of the type including a frame mounted on ground wheels and including a hitch for transporting the frame across the ground, the frame carrying a plurality of cultivator shanks each having a ground cutting tool for providing a cultivation action on the ground.

Cultivator frames of this type generally carry a cutting tool of the type having a front point and two diverging wings extending outwardly and rearwardly to provide a cutting action under a top surface of the ground.

In recent years many such cultivators have been manufactured and arranged for dual purposes that is an initial cultivating action usually in the fall for the purpose of turning the soil to incorporate crop residue and secondly for seeding in the spring. For cultivating the depth of the cutting action is generally deeper but does not need to be so accurately controlled. For seeding, seed tubes are provided on the frame and transport seeds to each of the cultivator shanks so the seeds are discharged underneath the cutting tool to lay the seeds in a row. For this purpose the cutting tool has to be accurately controlled so that the seeds are laid within a predetermined depth band. Excessive variations of the depth will vary the germination characteristics and lead to an uneven crop.

A lot of attention has therefore been applied to the design of the cultivator frame so as to support the shanks and the cutting tools or sweeps at a required height relative to the ground. Further considerations which must be taken into account in the design of the cultivator frame include the necessity for height adjustment to accommodate the different actions and to accommodate different crop varieties. Furthermore recent agricultural practices have significantly increased the amount of crop residue remaining on the ground after the harvesting has been completed. It is necessary therefore in a cultivator design to reduce the possibility of blockages occurring in the operation of the cultivator by collecting the crop residue into a bunch around the cultivator shanks. A yet further requirement in the design of a cultivator frame is that of converting the frame to a transport position.

One example of a conventional cultivator frame arrangement is shown in a brochure by John Deere entitled Seed Bed Tillage Equipment and in particular the 1060 Field Cultivator. This arrangement includes a center section towed by a hitch behind the tractor and two wing sections each extending out to a respective side of the centre section. Each wing section is formed of two separate portions including an inner portion and an outer portion connected at an outer end of the inner portion. Each of these portions includes ground wheels for supporting the portion in movement across the ground. In moving the transport, the outer wing portion folds inwardly on to the top of the inner wing portion following which the inner wing portion is folded upwardly so as to stand upwardly approximately at right angles from the end of the center section. This transport position is generally unsuitable because it mounts a very high load on the center section during the transport movement and since the dimensions of the folded frame are relatively wide and very high so that the frame is difficult to move through restricted areas and particularly under bridges.

A further disadvantage of this type of frame is that it is necessary to individually adjust the height of the frame sections so that a large number of hydraulic cylinders are required to operate this adjustment generally by raising and lowering the wheels.

The cultivator sweeps of course must cooperate to act across the full width of the cultivator frame but it is of course not possible to locate them side by side in a single row in view of spacing problems and also in view of the tendency of such an arrangement to carry the crop residue in the form of a rake. The shanks are therefore mounted on a plurality of parallel bars and generally at least three such bars are used so as to triple the amount of space between each shank on a bar and the next adjacent shank. One further disadvantage of the above type of cultivator frame is that the frame requires wheels located in the area of the cultivator shanks. Thus the wheels are rolling in the soil which has already been worked with the danger that the wheels will pick up moist soil which will eventually interfere with the proper rolling action of the wheel. In addition the location of the wheels within the area of the shanks requires a yet further increase in the spacing between the shank so it is often necessary to increase the number of bars from three up to as many as five. Such a five bar arrangement of course significantly increases the dimensions and weight of the frame and increases the distance between the front shanks and the rear shanks of the array.

Other examples of cultivator frame of the above general type are used by other manufacturers and include the same disadvantages. Some manufacturers have also attempted to increase the ability of the frame to follow the contours of the ground by allowing an increased floating action between one frame section and the next frame section and this arrangement yet further increases the number of wheels necessary for supporting the frame and further increases the size and weight of the frame thus further exacerbating the problems defined above.

It is also known to mount a relatively narrow cultivator frame directly on a three-point hitch of a smaller power tractor. One such example of a frame of this type is shown in a brochure by Morris Industries of Yorkton, Saskatchewan, Canada. This frame includes a three bar support for the shanks and two gauge wheel at sides of the frame which support the frame at a pre-set distance from the ground as the frame is free to float upwards and downwards on the three-point hitch. This arrangement is only suitable for very narrow implements and is therefore not suitable for the high productivity farms of today where up to sixty feet in width is required for a single pass of the cultivator frame.

It is also known to provide another form of agricultural tool bar for pulling ground working elements such as harrows, packers, rakes and the like in which the tool bar is arranged as a single elongate element with a longitudinal axis at right angles to the direction of movement of the tool bar across the ground. The tool bar is split into a center section and two wing sections with the center section mounted on two ground wheels spaced apart along the center section and each wing section includes a ground wheel adjacent an outer end. The inner end of each wing section is attached to a respective outer end of the centre section by a pivot coupling which allows pivotal movement about two mutually perpendicular axes each of which axis is at right angles to the longitudinal axis of the tool bar. This pivot coupling arrangement is arranged so that when the tool bar is rotated through 90°, the wing sections can pivot about a vertical axis transverse to the longitudinal axis so that the wing section moves rearwardly to trail from the outer end of the center section.

Examples of arrangements of this type are shown in Canadian Patents 1,267,318 (Just et al assigned to Morris Rod Weeder) and 1,099,566 (Summach et al assigned to Flexi-Coil Ltd.) and in U.S. Pat. Nos. 3,935,696 (Pavel) and 4,418,762 (Page assigned to Western Manufacturing Co.).

Each of these arrangements includes a tool bar in which the center section of the tool bar is mounted on a rear end of the hitch frame behind the ground wheel supporting the hitch frame. The tool bar is then actuated by a hydraulic cylinder so that it rotates about an axis generally slightly offset from the longitudinal axis of the tool bar itself without rotation being affected while the hitch frame and the wheels on the hitch frame remain stationary. Generally the outer wheel at the end of the wing section is arranged with its rotation axis lying on the longitudinal axis of the tool bar. A second wheel is usually provided with its rotation axis at right angles to the longitudinal axis of the tool bar so that when the tool bar rotates the second wheel engages the ground and lifts the first wheel away from the ground. In this way there is no need to adjust the angle of the wheel at the end of the wing section to accommodate the working position and the trailing position. However the above patent to Pavel shows an arrangement in which the wheel at the end of the wing section can be manually rotated about a vertical axis so that the single wheel carries the wing section in both the operating position and the trailing position.

Tool bars of this type are generally used with tools such as harrows, packers and the like which do not require an accurate depth control but instead are generally merely suspended from the tool bar to take up their own height by engagement with the ground surface.

A brochure of Western Manufacturing which shows the machine of the above United States patent also includes an arrangement in which a plurality of S-tine cultivator teeth are mounted on bars parallel to the tool bar and spaced rearwardly from the tool bar on arms extending rigidly from the tool bar in a horizontal direction. Height adjustment is effected by vertical movement of the wheel relative to the bar thus requiring a hydraulic cylinder for each of the wheels. The S-tines are intended to carry simple points rather than a sweep since the S-tine arrangement does not carry the sweep at a constant angle of attack which is required to maintain the sweep at the required depth.

SUMMARY OF THE INVENTION

It is one object of the present invention, therefore, to provide an improved agricultural cultivator arrangement and in particular an improved spring trip arrangement for a cultivator which allows side to side movement of the shank for avoiding an obstacle.

According to the invention, therefore, there is provided trip shank for mounting a ground working element comprising: a shank member having an elongate curved shank and a mounting shoe at a lower end of the shank for removably receiving the ground working element thereon; a mounting member for receiving and supporting the shank member; a clamp assembly for attachment of the mounting member to a tool bar for supporting the shank and mounting shoe at a position at the ground; the shank member having thereon a transverse engagement element adjacent an upper end thereof and extending outwardly to each side of the shank; the mounting member comprising a body defining a downwardly facing bottom engagement surface for engaging and locating the upper end of the shank member; the body including a rear downturned portion such that a shank engagement surface of the downturned portion faces forwardly; the downturned portion including a slot therein through which the shank passes, each side of the slot being shaped to engage the shank to prevent side to side shifting of the shank while allowing twisting of the shank about a trip axis extending generally in a forward direction; a spring applying a force to the shank member to move to a position in which the upper end of the shank member is in contact with the bottom engagement surface and the transverse engagement element is in contact with the shank engagement surface of the downturned portion to allow forward movement of the mounting member to apply a forward pulling force to the shank member; the shank member and the mounting member being shaped to allow a sideways force on the shank caused by impact with an obstacle to cause downward movement of one side of the transverse engagement element relative to the engagement surface of the downturned portion to allow sideways tripping movement of the shank by twisting movement about said trip axis.

One embodiment of the invention will now be described in conjunction with the accompanying drawings in which:

BRIEF DESCRIPTION OF THE DRAWINGS

FIG. 6 is an enlarged top plan view of the pivot coupling between the centre section and the wing section.

FIG. 7 is a vertical cross sectional view similar to that of FIG. 3 showing a modified arrangement incorporating packers behind the third cultivator shank.

In the drawings like characters of reference indicate corresponding parts in the different figures.

DETAILED DESCRIPTION

Figure 1:
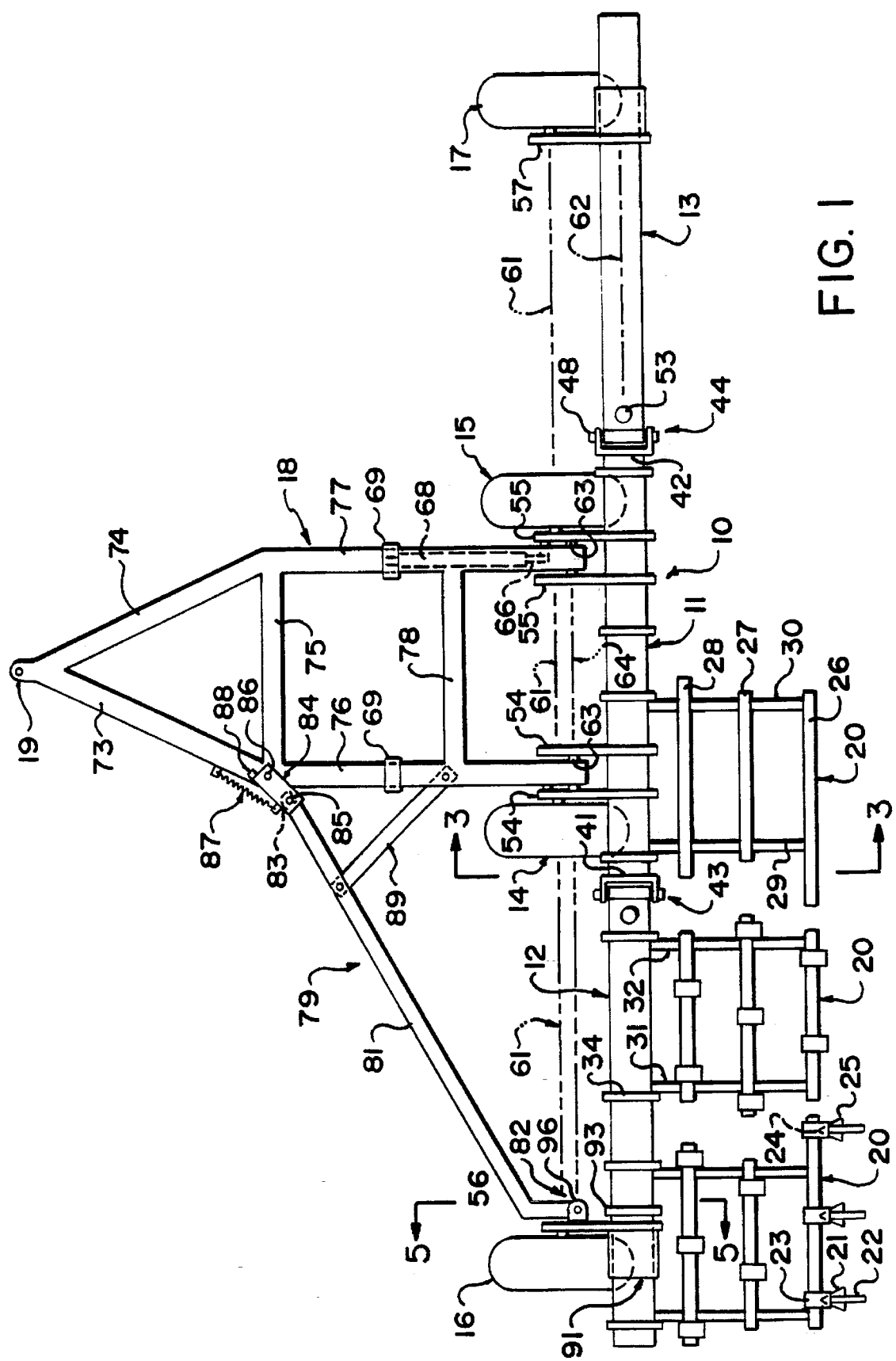
FIG. 1 is a top plan view of the cultivator according to the present invention with some of the elements omitted for convenience of illustration and showing the cultivator in the first operating position.

The cultivator of the present invention comprises a main tool bar 10 including a center section 11, a first wing section 12 and a second wing section 13. The center section is carried on ground wheels 14 and 15, the first wing section 12 includes a ground wheel 16 and the second wing section 13 includes a ground wheel 17. The ground wheels are connected to a hitch frame 18 including a front hitch 19 for connection to a tractor for transportation of the tool bar across the ground on the ground wheels. The tool bar trails a plurality of tool frames 20 each of which carries a plurality of cultivator tools 21 mounted on shanks 22 carried on a trip mechanism 23. The cultivator tools are arranged in an array on the respective tool frames so as to provide full coverage of the band of ground over which the cultivator frame passes at a required predetermined spacing between the cultivator tools. Each cultivator tool is of the type including a central point 24 and a pair of diverging wings 25 for effecting a cutting or slicing action under the soil to lift a top part of the soil in a conventional and well known manner.

Each of the tool frames 20 comprises three transverse bars 26, 27 and 28 arranged mutually parallel and parallel to the tool bar. The bars interconnected by side rails 29 and 30 which hold the bars parallel and communicate forces from the bars forwardly toward the tool bar. The bars are of different lengths and extend outwardly beyond the side rails to different positions so as to receive respective ones of the cultivator tools in an array which provides full coverage of the ground with the required spacing of the tools. The array is set out so that on each bar the tools are spaced by three times the normal spacing between the tools. This ensures the maximum amount of space between the tools on each bar for the passage of crop residue and trash therebetween while limiting a number of bars to a maximum of three. As shown in the example in FIG. 1, on a first of the tool frames the centre bar is of reduced length and on a second of the tool bars the centre bar is of increased length beyond the length of the first and third bars. This allows the frames to cooperate at the intersection therebetween to provide full coverage of the ground while ensuring the ends of the bars do not interengage to interfere with individual floating movement of the tool frames.

Figure 3:
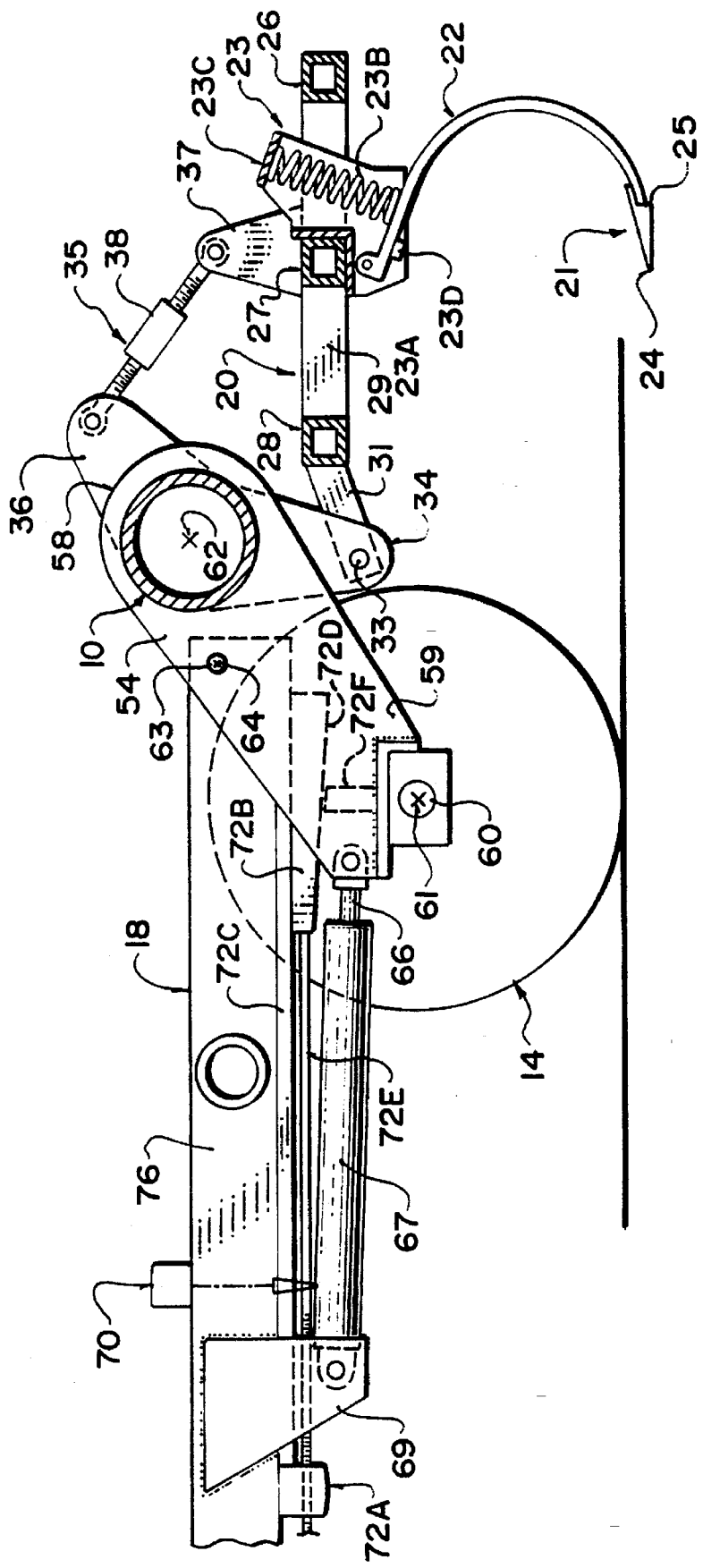
FIG. 3 is a view along the lines 3—3 of FIG. 1 showing the cultivator in the operating position.

As shown in FIG. 3, the shank 22 is pivotally mounted on a spring trip frame of the spring trip 23 by a pin 23A and a spring 23B extends from the upper surface of the shank upwardly and rearwardly to a support plate 23C so the spring biases the shank downwardly into engagement with a stop 23D so that the tool is normally held at a fixed position relative to the respective one of the bars on which the spring trip is mounted. The shank can however move upwardly against the bias of the spring 23B on engagement with an obstacle in conventional manner.

The frame 20 is coupled to the tool bar 10 by a pair of rigid arms 31 and 32 aligned with the rails 29 and 30 respectively. Each of the arms 31 and 32 extends forwardly and downwardly to a pivot pin 33 carried on a depending arm 34 attached to the tool bar 10. The arms 31, 32 are free to pivot about the pins 33 but this pivotal movement is restricted by a center link 35 extending from an upwardly and rearwardly extending plate 36 on the tool bar downwardly and rearwardly to a center post 37 on the center line of the tool frame. The link 35 includes a turnbuckle 38 to allow adjustment of the length thus adjusting the angle of the tool frame around the tool bar. The cooperation of the two arms 31, 32 and the center link 35 holds the tool frame at fixed but adjustable angle around the tool bar so that in action the shanks and the sweeps are maintained at constant depth.

The tool bar 10 as shown in FIG. 3 is of circular cross section and tubular form defining an elongate tubular body. The arms 34 are welded to the tubular tool bar at the required spacing along the length of the tool bar so that each arm 34 is arranged at a respective one of the links.

The center section 11 of the tool bar includes outer ends 41 and 42 which are connected to the inner ends of the wing sections by pivot couplings 43 and 44.

In the position shown in FIG. 1, the tool bar sections are aligned and are maintained generally in this alignment by the pivot couplings 43 and 44. In a position shown in FIG. 2, the tool bar is rotated through 90° thus rotating the pivot coupling through 90° and allowing the wing sections to move into a trailing position generally at right angles to the centre section. The structure of the pivot couplings 43 and 44 is thus shown in FIGS. 2 and 6. Each pivot coupling thus comprises a base plate 45 welded onto the respective outer end of the center section, the base plate having a width substantially equal to the diameter of the tool bar and a length greater than twice the diameter of the tool bar so that the base plate 45 extends downwardly from the tool bar to a lower most end 46 spaced away from the tool bar by a distance greater than the diameter of the tool bar. On each side of the base plate 45 is provided a flange 46, 47 extending outwardly from the base plate toward the wing section. The flanges and the base plate thus form a channel. A pivot pin 48 is mounted across the channel and through the flanges 46 and 47 adjacent the bottom end 46 of the base plate. The pivot pin carries a collar 49 located within the channel for free for pivotal movement around the pin and connected to a coupling plate 50. The coupling plate 50 carries a pair of flanges 51 and 52 generally at right angles to the coupling plate 50. A pin 53 passes through the flanges 51 and 52 and through the inner end of the wing section. The pin 53 at right angles to the pin 48 and both are at right angles to a longitudinal axis of the tool bar. The support plate 50 thus is pivotally mounted on the pin 48 and can rotate from a position lying generally along the channel as shown in FIG. 6 to a position generally at right angles to the channel as shown in FIG. 2.

In the position shown in FIGS. 1 and 6, the pivot pin 48 lies in a horizontal direction and allows the wing section of the tool bar to pivot about that horizontal axis upwardly and downwardly to accommodate changes in ground contour. In practice, the pin 48 in the working position lies slightly forward of the horizontal due to rotation of the tool bar by an angle more than ninety degrees so that the pin 53 takes up some of the pivotal movement of the wing section about the horizontal while there is no pivotal movement allowed about a vertical axis due to the coupling of the hitch as described hereinafter.

Figure 2:
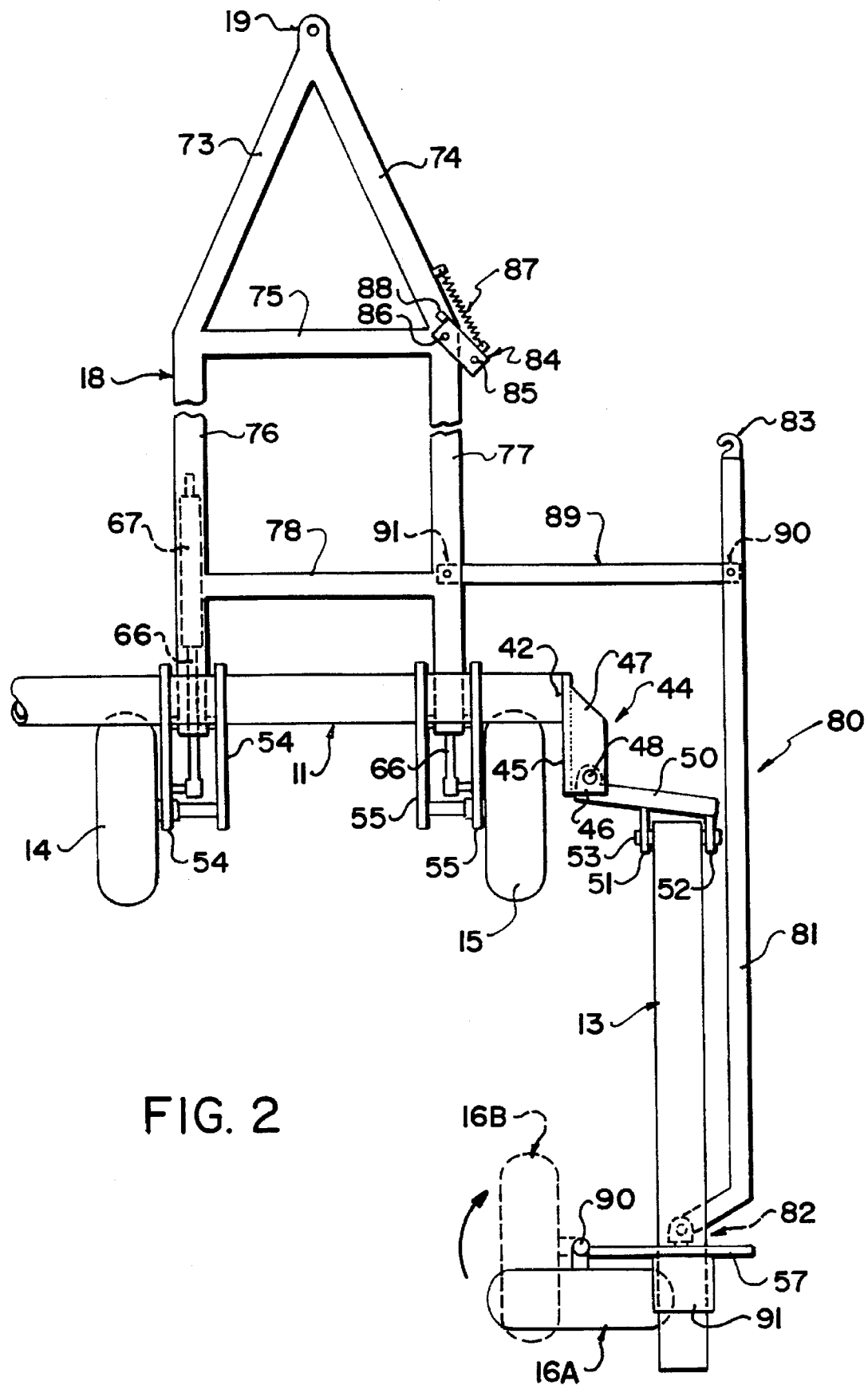
FIG. 2 is a similar top plan view of the cultivator of FIG. 1, again with a number of the elements omitted for convenience of illustration, the cultivator being in the transport position.

In the position shown in FIG. 2, the pin 48 is turned to a vertical orientation and this allows the wing section to pivot about that vertical axis to a position trailing behind the outer end of the centre section. In this position the pin 53 is in a horizontal orientation and allows upward and downward movement of the wing section as it trails again to accommodate changes in ground contour.

The position of the lower end of the base plate 45 downwardly from the outer end of the tool bar provides a long length of the support bar 50. This long length of the support bar 50 as shown in FIG. 2 moves the wing section outwardly as the wing section and the support bar pivot about the pin 48. This outward movement is greater than the diameter of the tool bar itself and spaces the tool bar outwardly to a sufficient distance that the cultivator shanks and tools do not interengage when the tool bar is moved to the transport position as described hereinafter.

The length of the base plate 45 is arranged to be substantially at a maximum which can be accommodated without moving the base plate to close to the ground to avoid engaging and blocking stubble standing on the ground. In practice the bottom end of the base plate is arranged to be of the order of eighteen inches from the ground which certainly can accommodate crop residue. The lower end of the base plate is arranged to be at approximately the same height as the lower end of the arms 34 which are again at the lowest possible height from the ground which can be obtained without interfering with the crop residue.

Each of the ground wheels 14, 15, 16 and 17 is interconnected to the tool bar by a respective one of a plurality of braces 54, 55, 56 and 57. The braces 54 and 55 are substantially symmetrically arranged on the centre section as described hereinafter. The braces 56 and 57 are also substantially identical and symmetrically arranged on the wing sections but are different from the braces 54 and 55 as will be described hereinafter.

The structure of the braces 54 and 55 is best shown in FIG. 3 and each comprises a pair of parallel flat plates at right angles to the tool bar having an upper end portion 58 through which the tool bar 10 passes and to which the tool bar is welded. The plates are thus rigidly connected to the tool bar and support the tool bar. From the upper end 58, the plates forming the brace 54 extend forwardly and downwardly to a lower end 59 at which is mounted an axle 60 of the ground wheel 14. The ground wheel can thus pivot about an axis 61 at the axle 60 and this axis is spaced at an opposed end of the link 54 from the longitudinal axis 62 of the tool bar 10.

The links 54 and 55 each are mounted for pivotal movement about a pin 63 mounted on the hitch frame 18. The pins 63 are located on a common line 64 which is horizontal and spaced from both the axis 61 of the ground wheels and from the longitudinal axis 62 of the tool bar.

The links 54 and 55 each connect with a piston rod 66 of a respective one of a pair of actuating cylinders 67 and 68 extending from the link to a bracket 69 on the hitch frame 18.

The cylinders 67 and 68 are actuated by a control system schematically indicated at 70 mounted on the hitch frame and responsive to the supply of hydraulic fluid under pressure from the tractor through control lines (not shown).

In a retracted position of the cylinder 67 and 68, therefore, the ground wheel is pulled forwardly to a position forward of the tool bar 10 with the tool bar 10 thus trailing the ground wheel at a position upwardly and rearwardly of the axle thereof. In this position the arms 34 extend substantially vertically downwardly from the tool bar and thus carry the frame extending horizontally rearwardly from the arm and thus from the tool bar. However it will be appreciated that slight movements of the cylinder 67 and 68 will cause the links 54 and 55 to pivot about the pins 63. In the position shown in FIG. 3, slight extension of the cylinder 67 will cause the wheel to move downwardly and the tool bar to move upwardly. Small movements therefore of the cylinder effect adjustment of the height of the tool bar from the ground and thus adjust the height of the frame 20 and the tools carried thereby from the ground. This adjustment is effected under control of the control unit 70 but is also mechanically located by a mechanical setting device 71 mounted between the link and the hitch frame 18. In the arrangement shown the mechanical setting device comprises a wedge member 72B mounted on the underside of a reinforcement plate 72C welded on the bottom of a horizontal frame member 76. The wedge member 72B has an inclined bottom surface 72D and is mounted for sliding movement along the bottom of the plate 72C pulled by a rod 72E. Thus the wedge member can move back and forth to a required position. The service 72D of the wedge member engages an abutment bar 72F attached to a bracket on the link 54 supporting the wheel axle 60. The use of the wedge member 72B provides the ability to accommodate significant forces from the bar 72F against the plate 72B without danger of damaging the structure. The mechanical setting device is provided on both links 54 and 55 and is adjusted by a control device in the form of a hand crank shown schematically at 72A so as to fix the height of the tool bar and thus the cutting tools in dependence upon the requirements of the farmer in the particular operation involved. The use of the mechanical setting devices avoids the possibility of slip in the cylinders which could occur if cylinders only were used to set the height.

The hitch frame 18 comprises a pair of outwardly and rearwardly diverging frame members 73 and 74 which connect an apex at a forward end at which the hitch 19 is located. At a rear end of the frame member 73 and 74 is provided a cross member 75 and two parallel frame members 76 and 77 which extend rearwardly from outer ends of the cross member 75. A further cross member 78 interconnects the frame member 76 and 77 and holds them in a rigid rectangular structure. The bracket 69 of the hydraulic cylinder 67, 68 is mounted on the respective frame member 76, 77 at a position part way therealong. The hitch frame is formed from tubular beams welded together to form a rigid structure to enable communication of force from the tool bar through the braces into the rear end of the hitch frame for communication to the hitch 19. The two plates of each brace are arranged on opposed sides of the members 76, 77.

The hitch frame further includes two wing frame sections 79 and 80 only one of which is shown in each of FIGS. 1 and 2 for convenience of illustration but it will of course be appreciated that the wing frame sections are indeed symmetrical. Each wing frame section of the hitch thus comprises an elongate rigid beam 81 having a coupling 82 at an outer, rear end for connection to the brace 56, 57 and a hook 83 at the forward end for attachment to a latch 84 mounted on the hitch frame 18 at the forward end of the member 76, 77. The latch member 84 includes a vertical pin 85 around which the hook engages. The pin 85 is mounted on a pivotal link mounted for pivotal movement about a vertical pin 86 on the hitch frame so that the pin 85 can pivot forwardly and rearwardly along the side of the hitch frame. The link 84 is spring biased by a spring 87 onto a stop member 88 which holds it projecting outwardly and rearwardly in the general direction of the beam 81. The link can however pivot rearwardly from that position to allow the hook 83 to be released from the pin 85 for movement to the transport position as shown in FIG. 2. When the hook member is moved back to the operating position shown in FIG. 1, the hook member automatically engages over the pin and pushes the pin slightly rearwardly to snap into place hooked around the pin for communicating forces from the hitch frame through the wing frame section to the outer brace 56, 57. Automatic release of the pin 85 from the hook 83 is effected by a cable which extends from the link 84 rearwardly to a suitable position on the tool bar or on the hydraulic cylinder actuator so that when the tool bar is fully moved to the transport position as described hereinafter the link 84 is pivoted rearwardly to release the pin to allow the wing frame portions of the hitch to move into the transport position as shown in FIG. 2.

The forward end of the beam 81 is supported by a horizontal support arm 89 which is pivotally connected at an outer end 90 to the beam 81 at a position part way along the beam and is pivotally connected to the respective frame member 76, 77 at its inner end 91. The position and length of the support arm 89 is arranged so that it holds the beam 81 in a position outwardly of the tool bar in the transport position as shown in FIG. 2. The support arm also controls the movement of the beam as it is moved forwardly and inwardly so that the hook takes up the required position at the latch 84.

Figure 5:
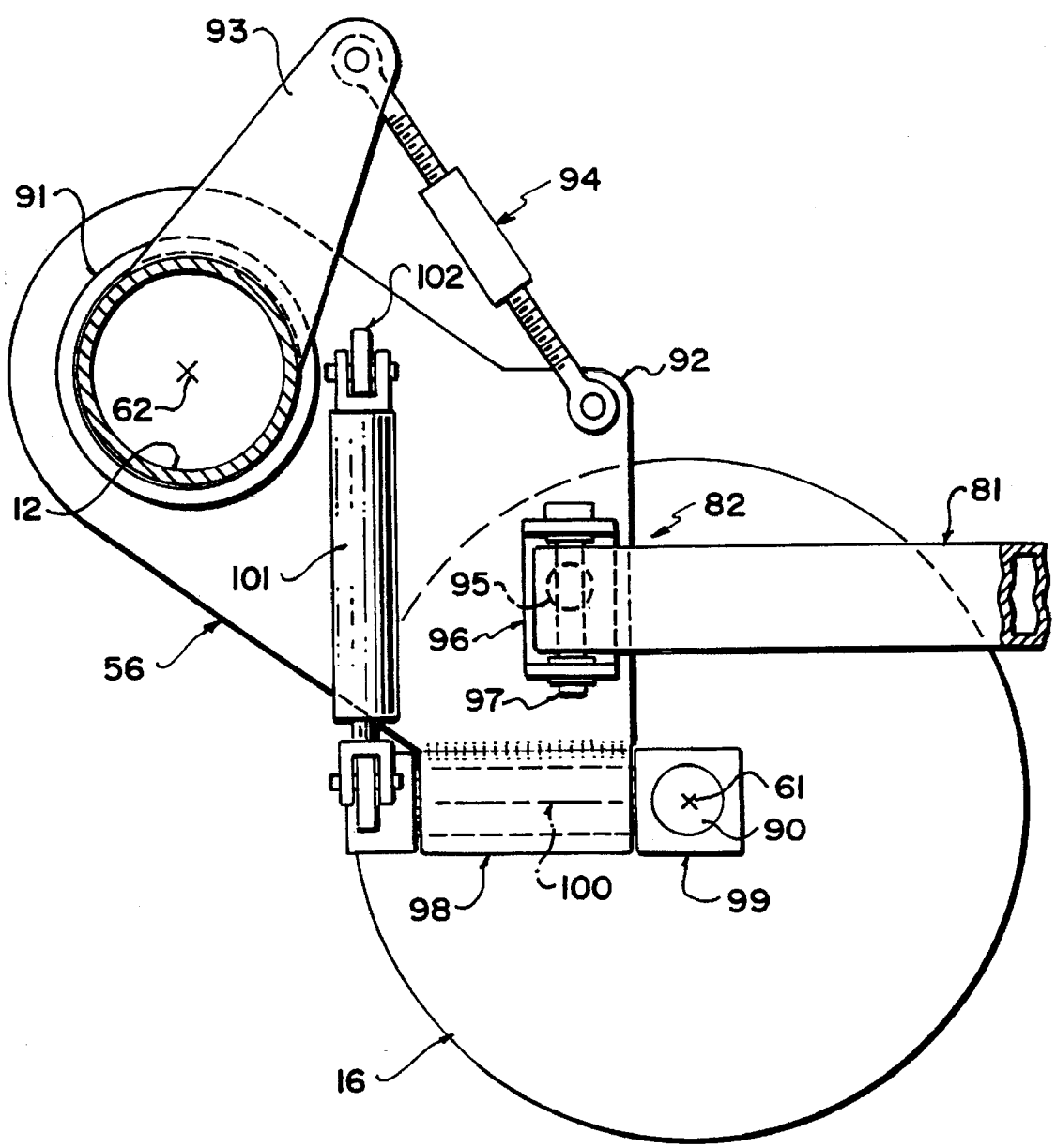
FIG. 5 is a view along the lines 5—5 of FIG. 1 showing more detail of the brace between the ground wheel at the outer end of the wing section and the tool bar.

Turning now to FIG. 5, the details of the brace 56, 57 are shown. Basically the brace 56 is similar in construction and operation to the braces 54, 55 in that the brace has an upper end mounted on the wing section 12, 13 of the tool bar and a lower end carrying an axle 90 of the ground wheel 16. The position of the brace is arranged so that the axis of the axle 90 is aligned with the axis 61 of the ground wheels 14 and 15. Thus all of the ground wheels lie on a common axis. The brace 56 is however modified relative to the brace 54 in that the brace is formed from a single plate and this is not directly welded to the tube forming the tool bar but is instead mounted on a collar 91 surrounding the tool bar section 12. This allows rotation of the brace relative to the tool bar about the longitudinal axis of the tool bar. The brace 56 further includes a lug 92 which extends outwardly away from the tool bar section 12. The brace comprises a plate lying in a radial plane of the tool bar section. A second lug 93 is welded to the tool bar section 12 and is angularly spaced from the lug 92. The lug 93 forms a plate also lying in a radial plane closely adjacent the plane of the plate forming the brace 56. A turnbuckle 94 connects between the lugs 92 and 93 for adjusting the angular orientation of the brace 56 relative to the section 12 of the tool bar. This adjustment allows slight rotation adjustment of the brace 56 relative to the braces 54 and 55 and this slight adjustment rotation acts to slightly raise or lower the tool bar section 12 relative to the tool bar section 11 to ensure equal height of the tool bar along the full length of the tool bar. This adjustment therefore accommodates slight misalignment created in manufacture or should any twisting of the system occur.

The brace 56 carries a pin 95 which is directly aligned with the pins 63 of the braces 54 and 55. The pin 95 carries a clevis 96 which receives the rear end of the beam 81 which can pivot relative to the clevis about a pin 97 at right angles to the pin 95.

The brace 56 is further modified relative to the braces 54 to provide a steering movement of the wheel 16 from the position indicated at 16A in FIG. 2 to the position indicated at 16B. For this purpose the brace carries a sleeve 98 at the lower end thereof with that sleeve allowing rotation of an axle support portion 99 of the brace which carries the axle 90 and allows rotation of the axle 90 and the wheel 16 about an axis 100 which is at right angles to the longitudinal axis 62 of the tool bar. This rotation of the axle support portion 99 is effected by a hydraulic cylinder 101 carried on a bracket 102 mounted on the brace.

In operation of the cultivator, the cultivator is positioned and arranged as shown in FIGS. 1 and 3 which show the operating position. In this position the braces are pivoted so that the ground wheels are pulled forwardly in front of the tool bar with the tool bar positioned upwardly and rearwardly from the axles of the ground wheels. In this position the required height of the tool bar is adjusted by operating the mechanical limit device which locates the angular orientation of the brace relative to the hitch frame. In this position the height of the outer ends of the wing sections is adjusted by operating the turn buckles 94 so that the tool bar is set at exactly the required height thus adjusting the height of the pivot pin 33 which locates the position of the tool frame and thus the sweeps carried thereby.

In this arrangement of the cultivator frame, the tractor vehicle pulls the cultivator frame forwardly thus drawing the cultivator sweeps across the ground in a cutting action. As is conventionally known, the sweep is shaped with a required angle of the side edges so as to tend to cut slightly downwardly into the ground. The proper balance, therefore, of the position of the pivot pin 33 relative to the angles of attach of the sweeps ensures that all of the sweeps carried on the three parallel support bars remain at the required orientation without the tendency of the rear sweeps to lift from the ground or to dig deeper into the ground.

The tool bar can be moved to an intermediate raised position both for the purposes of releasing any blockage which may occur and for the purposes of turning the cultivator at an end of a field. Thus should excessive buildup of crop residue occur so that a blockage of the crop residue generates within the area of the cultivator shanks, the tool bar could be raised to the intermediate position to release that blockage. Also the lifting of the cultivator shanks and sweeps from the ground allows maneuverability of the frame for turns without generating excessive side loads.

This intermediate position is obtained by actuating the cylinders 67 and 68 to rotate the braces about the axis 64 of the pins 63 and the pins 95. This movement is effected to a position in which approximately the wheel is located vertically underneath the tool bar thus rotating the tool bar through approximately 45° to 60°. This rotation of the tool bar of course also rotates the support arms 34 through the same angle. As the support arms are rotated the tool frames pivot in the opposite direction the tool frames are caused to rotate with the tool bar to the raised position. This lifts the tool bar to a position of the order of 45° from the ground thus holding the sweeps away from the ground to a distance of the order of 18 inches allowing release of crop residue without difficulty.

The control device 70 is arranged to provide an initial movement of the cylinders to this intermediate position and to hold the device at that intermediate position without the possibility of inadvertently moving beyond that intermediate position without a specific control function actuated by the operator. In practice this is achieved by providing a control element of the hydraulic circuit which halts flow after the cylinders reach the intermediate position. Current tractor hydraulic controls are of the type which continue to supply fluid to a cylinder until the floe stops and hence once actuated the tractor control will move the cylinder to the intermediate position in which it is halted. Further movement to the transport position will only occur if the operator re-actuates the switch.

In this intermediate position the wheels 16 and 17 remain in the operating position as shown in FIG. 1 and do not rotate. In this intermediate position the latches 84 remain connected with the pins 83 so that the wing sections of the hitch remain fully coupled for further forward movement of the cultivator frame towed by the tractor vehicle.

Figure 4:
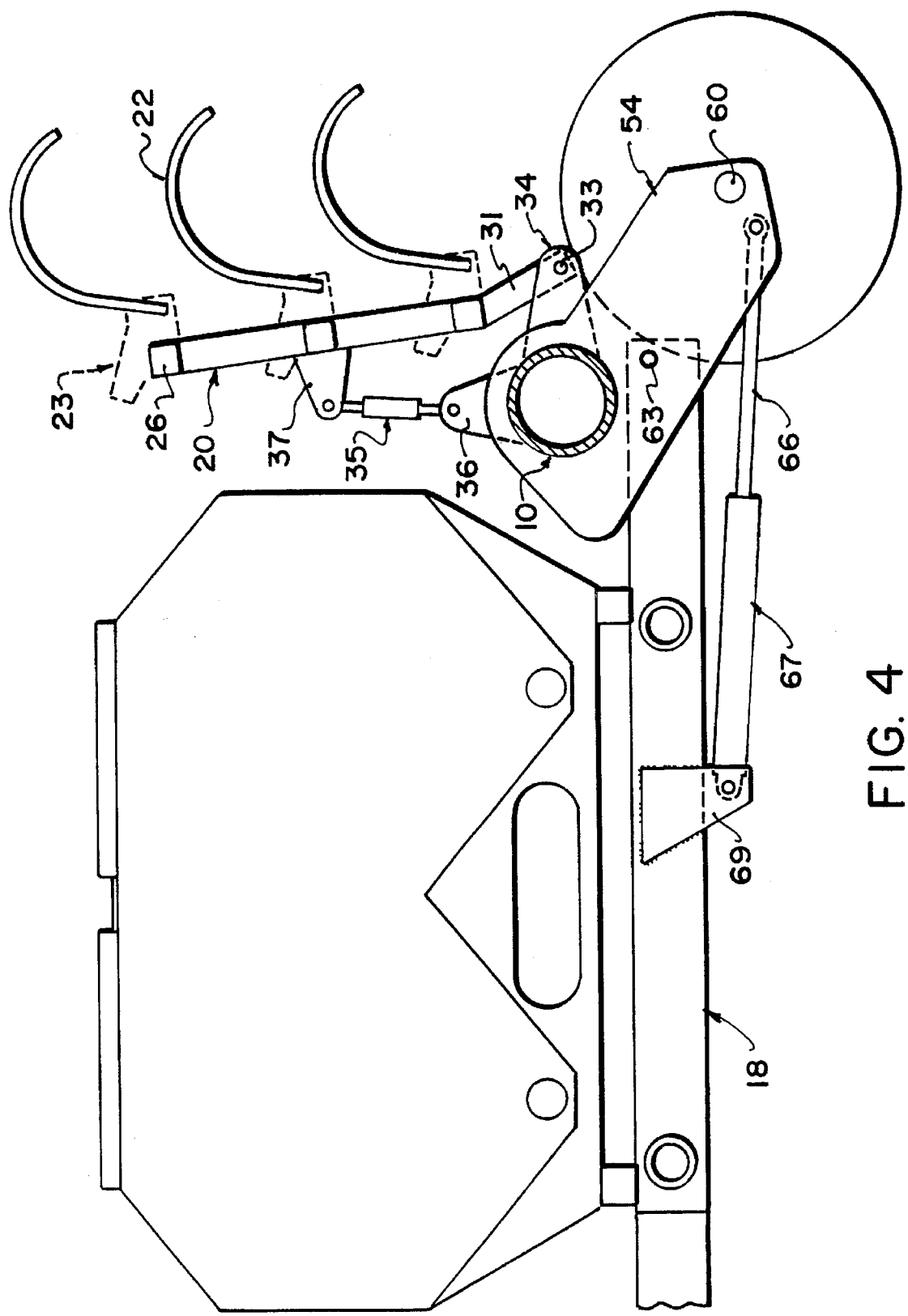
FIG. 4 is a cross sectional view along the same lines 3—3 of FIG. 1 showing the cultivator in the raised transport position, the arrangement of FIG. 4 including illustration of a hopper mounted on the hitch frame for supplying seed through an air transport system (not shown).

In the event that the operator wishes the cultivator frame to move to the transport position, the cylinders 67 and 68 are operated by the control device 70 to move to the position shown in FIGS. 2 and 4.

The cylinders thus pivot the braces about the axis 64 so as to move the ground wheels rearwardly and to pivot the tool bar forwardly over the rear end of the hitch. This movement of course lifts the tool frames as previously described and moves the tool frames to a position in which the centre of gravity of the tool frame is forward of the pin 33. This movement generates a forward movement of the sweeps to bring them closer to the tool bar and thus move them to a position in which the sweeps do not interengage when the tool bar wing sections are moved to the transport trailing position shown in FIG. 2.

This movement to the fully raised position effected by the actuator cylinders 67 and 68 also operates to pull the latches 84 forwardly to release the hooks 83 from the pins 85.

The movement of the cylinders 67 and 68 to the ends of their stroke also operate to effect the controller 70 through a conventional sequencer valve arrangement to actuate the cylinders 101 to rotate the axle support 99 about the vertical axis 100. It will be appreciated that the rotation of the tool bar from the position shown in FIG. 3 to the position shown in FIG. 4 is approximately 90°. The rotation in FIG. 5, therefore, brings the sleeve 98 to the vertical position so that the axis 100 is vertical. This movement is accommodated in the beam 81 by the rotation of the clevis 96 about the pin 95. Actuation of the cylinders 101 thus causes the outside wheels 16 and 17 to rotate through 90° to take up the position shown in 16B in FIG. 2.

With the tool bar thus rotated, the hitch released and the outside wheels rotated, forward movement of the cultivator frame causes the centre section to move forwardly while the wing sections move inwardly and rearwardly to take up the trailing position shown in FIG. 2.

In this trailing position the weight remains carried by the ground wheel so that there is no increase in weight on the centre section. There is no lifting of the heavy frame sections so that the movement can be effected with relatively light loading on the various hydraulic cylinders involved. The transport position does not involve any folding up of frame sections so that the height of the cultivator remains relatively low and certainly can accommodate conventional bridges and conventional roadways.

When it is intended to return from the transport position to the operating position, this can be effected simply by actuation of the controller to operate firstly the cylinders 101 to move through a distance sufficient to turn the wheels through 45°. A backup movement of the centre section driven by the tractor thus pushes the center section rearwardly and the 45° angle of the wheels pushes the wing sections outwardly and forwardly relative to the center section to return the wing sections to the initial position. When the initial position is reached, the cylinders 101 are again actuated to rotate the wheel 16 and 17 to the initial working position. The controller then using the sequence valve system actuates the cylinders 67 and 68 to pull the braces about the axis 64 thus again turning the tool bar rearwardly and pulling the ground wheels forwardly to the position shown in FIG. 1. This forward movement also releases the latches 84 to again grasp the pins 85 to hold the hitch in the required position for normal operating movement.

Figure 7A:
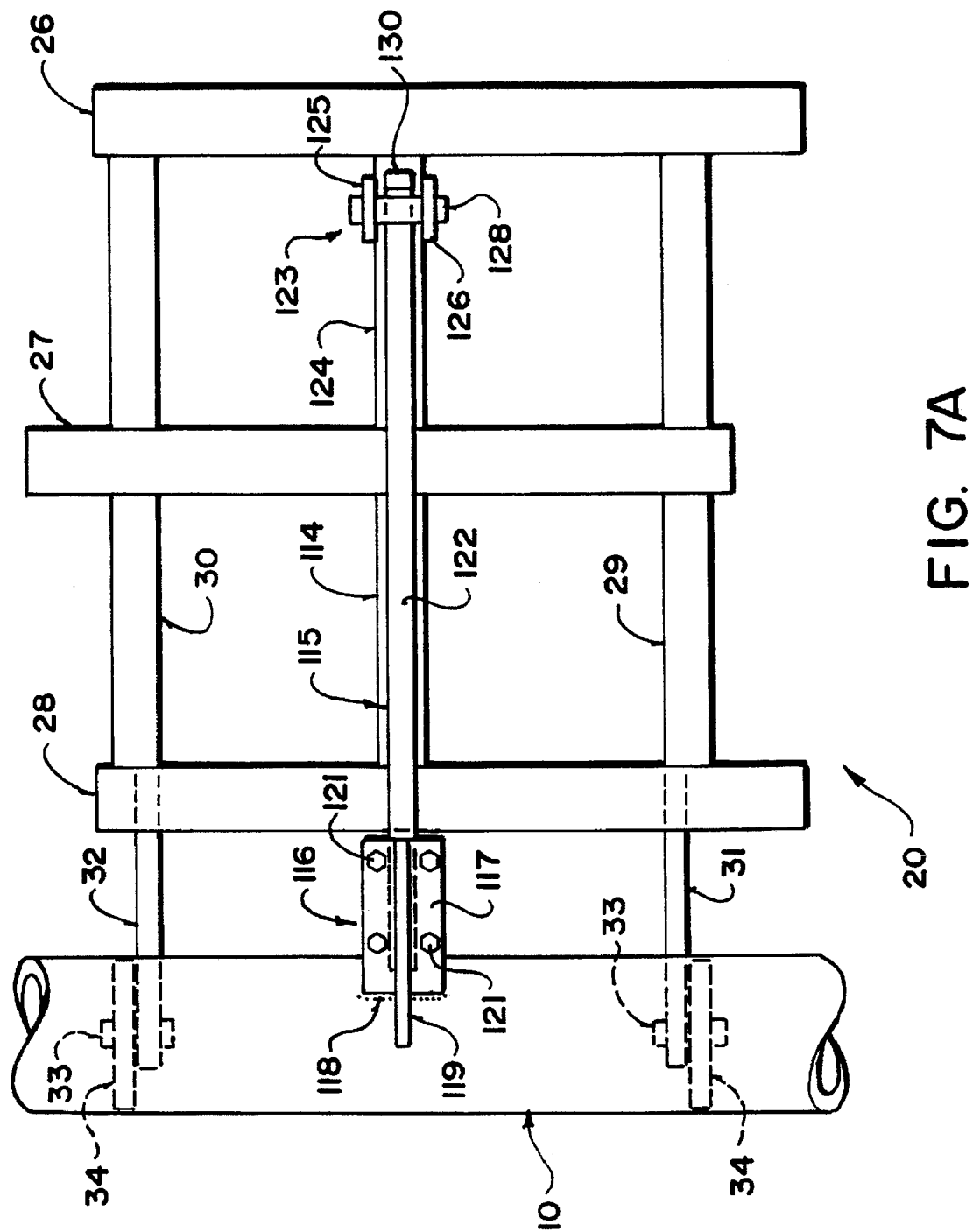
FIG. 7A is a top plan view of the modified arrangement of FIG. 7 with the packers and shanks omitted for convenience of illustration.

In FIGS. 7 and 7A is shown an alternative arrangement which is modified relative to that shown in FIG. 3 by the addition of packers 110 mounted as a gang on the rear of the tool frame 20. The packer gang 110 is shown only schematically since the design can vary and is well known to one skilled in the art. The packer gang is mounted on the rear bar 26 of the tool bar 20 by a mounting plate arrangement 111 which allows vertical adjustment of the height of the packer wheels relative to the shanks.

In FIG. 7 the shanks are shown only schematically and indicated at 112 and supported on spring trip devices 113 again only shown schematically for convenience of illustration. In FIG. 7A the shanks and spring trip mountings are omitted altogether showing only the bars 26, 27 and 28 as previously described.

In this arrangement the bars are modified so that they are all of the same length but the center bar 27 is offset to one side of the bars 26 and 28 in a transverse direction so as to project outwardly beyond one side rail to a greater extent. This again allows the mounting of the shanks at staggered positions to provide the required spacing with adjustment of the spacing being possible by modifying the location of the shanks on the individual bars.

Also as shown in FIG. 7A the transverse bars are connected by two side rails 29 and 30 but in addition there is provided a center rail 114 centrally between the two side rails 29 and 30.

In order to apply downward pressure to the rear of the tool frame 20 and to the packers if the packers are provided or to other elements if mounted at the rear of the tool frame in replacement for the packers, there is provided a spring system generally indicated at 115. The spring system is located on top of the center rail 114. The spring system comprises a clamp assembly 116 mounted on the tool bar 10 comprising a flat plate 117 which is welded to the tool bar at its forward edge 118 and is supported by a vertical gusset plate 119 also welded to the tool bar 10 and extending rearwardly over the top of the plate 117 to which a bottom edge of the gusset plate is welded. A clamping plate 120 lies underneath the plate 117 and is clamped to the plate 117 by bolts 121. Between the plate 117 and the clamping plate 120 is mounted a spring bar 122 which is a simple straight bar formed of steel having sufficient resilience to act as a spring, the bar being straight in its relaxed condition. The bar 122 extends from a position between the plates 117 and 120 rearwardly over the rail 114 to an abutment member 123 mounted on the rear part 114A, 124 of the rail 114. The abutment member 123 comprises a pair of side plates 125 and 126 which are clamped to the rear part 124 of the rail 114 by a pair of bolts 127 respectively above and below the rail portion 124. This supports the plates 125, 126 in a vertical upstanding parallel position spaced by the width of the rail portion 124. The bar 122 is narrower than the rail 124 and extends between the plates 125 and 126 above the upper bolt 127 and below a transverse pin 128 so that the bar is located between the pin 128 and the bolt 127. The plates 125, 126 have additional holes therethrough in aligned positions as indicated at 129 so that pins can be placed through selected ones of the holes to locate the height of the bar relative to the rail portion 124 at different adjustment positions. This adjustment of course acts to adjust the spring pressure applied from the tool bar 10 to the tool frame 20 through the spring bar 122 while maintaining the orientations of the those elements unchanged. In addition it will be appreciated that rotation of the tool bar 10 in a clockwise direction as shown in FIG. 7 will increase the spring pressure on the tool frame for increasing the pressure on the shanks and the implements carried behind the tool frame.

A rearmost end of the spring bar 122 is turned upwardly as indicated at 130 at a position behind the pin 128. In the event that it is required to lift the tool frame from the ground, rotation of the tool bar, as previously described, in the counterclockwise direction acts to move the tool bar to the transport position and also rotates the spring bar 122 in the counterclockwise direction. The spring bar thus is flexed in the opposed direction to that shown and that flexing continues until the upturned portion 130 engages the rear face of the pin 128 following which further rotation of the tool bar 10 in the counterclockwise direction pulls up on the pin 128 and thus lifts the tool frame to follow the further rotation of the tool bar in the counterclockwise direction.

Figure 8:
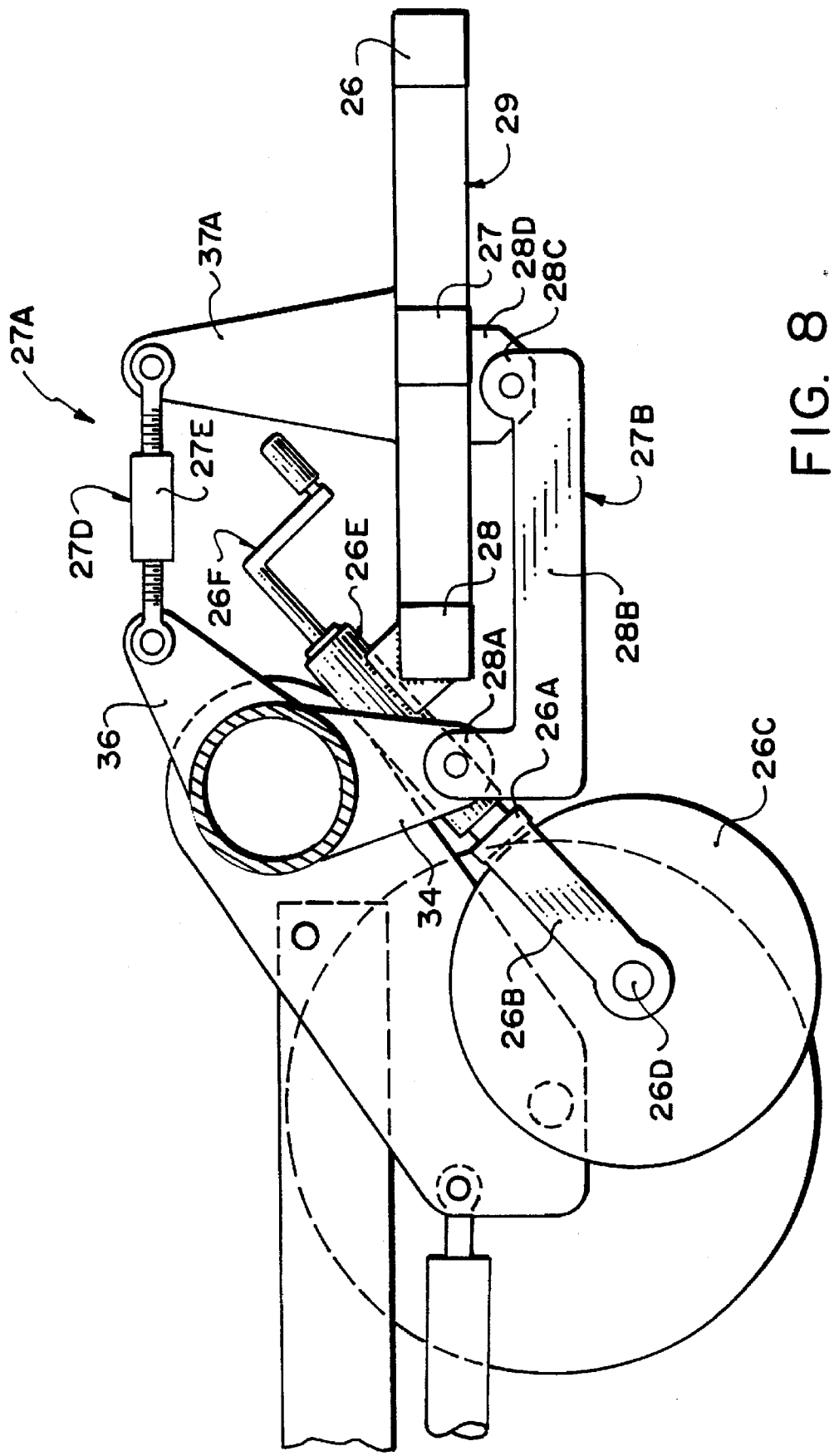
FIG. 8 is vertical cross-sectional view through the tool bar showing an alternative tool frame including a floating action and gauge wheel.
Figure 9:
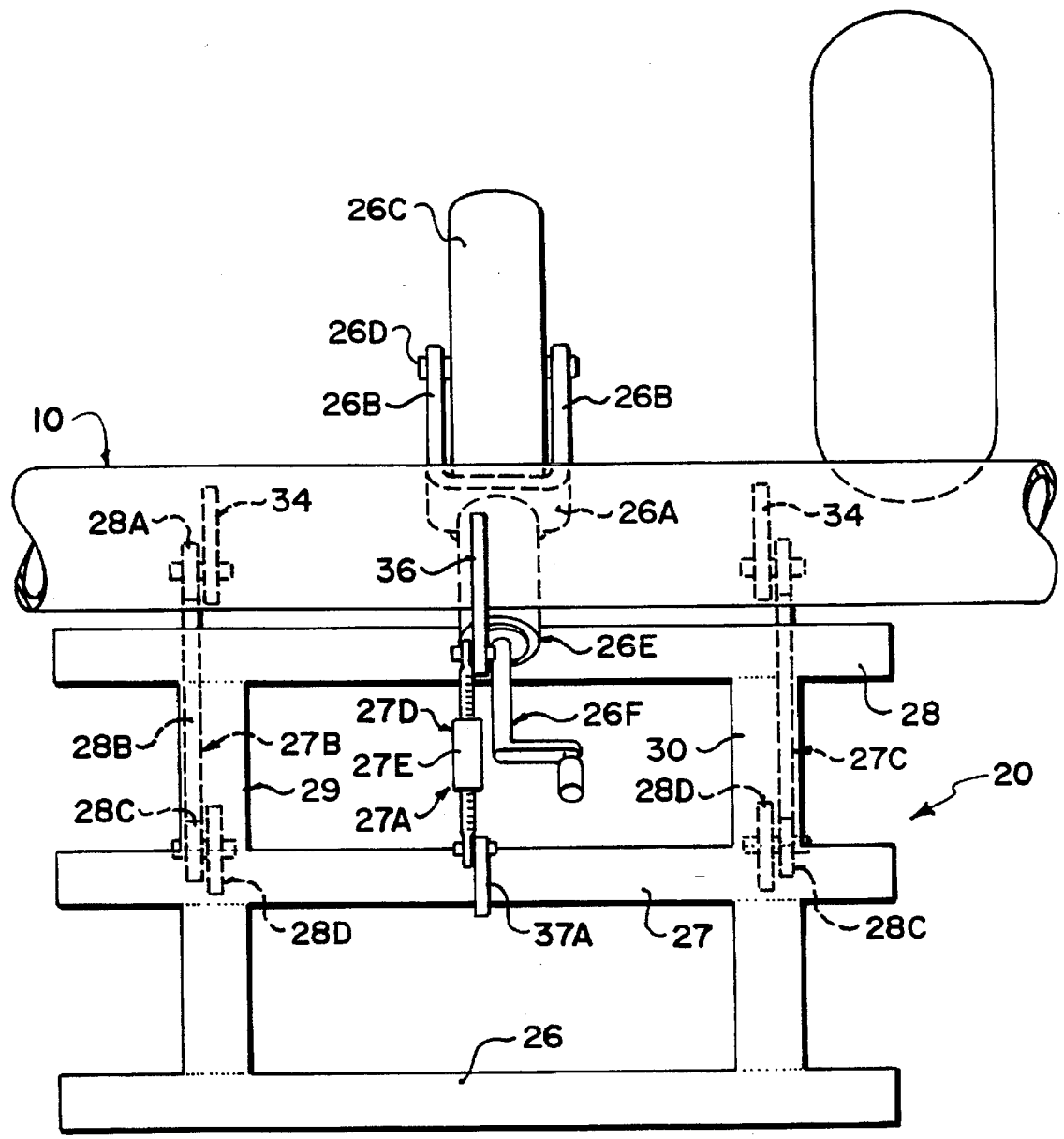
FIG. 9 is a top plan view of the tool frame of FIG. 8.

Turning now to FIGS. 8 and 9 there is shown an alternative form of the tool frame which is mounted on the same tool bar as previously described and which has the cultivator shanks omitted for convenience of illustration. The tool bar as previously described therefore carries the modified tool frame on the arms 34 and on the strut 36. In this arrangement the tool frame includes the three tool bars 26, 27 and 28 previously described which are inter-connected by the longitudinal beams 29 and 30. In this arrangement the tool frame carries a fork 26A which extends downwardly and forwardly from the front bar 28 at a center point of the front bar between the longitudinal beams 29 and 30. The fork 26A is mounted in a screw jack sleeve 26E operable by a hand crank 26F and extends downwardly and forwardly to a pair of arms at 26B straddling a gauge wheel 26C carried on an axle 26D. The tool frame is thus cantilevered from the gauge wheel but is supported thereby in a floating action. The height of the tool frame can thus be adjusted to control depth of operation of the shanks by operating the hand crank manually on each tool frame in turn. The tool frame is maintained in its horizontal orientation by a three point linkage system generally indicated at 27A including a pair of lower link arms 27B and 27C and an upper central link 27D. The upper link arm includes a turnbuckle 27E and extends from the strut 36 to the post 37A on the tool frame. In this arrangement the post 37A is of increased height of the post of the previous arrangement so that the upper link 27D is parallel to the horizontal portions of the lower links 27B and 27C. Each lower link includes a vertical portion 28A at a front of the link, a horizontal portion 28B and a vertical portion 28C thus forming a generally U-shape. The vertical portions thus displace the horizontal portion 28B vertically downwardly underneath the bar 28. The rear vertical portion 28C is connected to a plate 28D welded to the underside of the longitudinal beam 29, 30.

After adjustment of the hand crank to adjust the height of the tool frame, the turnbuckle 27E is operated to level the tool frame and as far as possible to properly align the upper and lower links, the tool frame is thus supported on the links for substantially parallel floating action in the vertical direction. The lower links do not allow loose side to side movement in the manner of a conventional three point hitch but instead hold the tool frame against side to side movement so it is allowed to effectively to move only vertically in a floating action. The height of the tool frame from the ground is controlled by the gauge wheel 26C independently of the height of the tool bar. The arrangement of the U-shaped lower links is such that the horizontal portion thereof is spaced downwardly from the front bar 28 by distance to allow the downward floating movement to a depth which normally can be expected. However upon further downward movement, the front bar 28 engages the top of the lower links and thus prevents the tool frame from moving downwardly beyond that pre-determined position. This engagement is used in the movement in the tool bar to the transport position so that as the tool bar rotates, the tool frame drops until it engages the lower links and then is carried by the lower links upwardly until the center gravity moves to a position forwardly of the tool bar whereupon the tool frame topples forwardly until it engages a suitable stop. It will be noted that the gauge wheel extends forwardly from the tool frame and thus this position forwardly of the cultivated shanks and does not interfere with those shanks in their operation. Furthermore the gauge wheel runs on the ground prior to the cultivation action and thus remains generally clean from collected soil materials. Furthermore the gauge wheel is positioned sufficiently forwardly that it lies between the main support wheels. While not directly aligned with the axis of the front wheels, the axis of the gauge wheels is positioned sufficiently forwardly that the gauge wheels tend to move with the main wheels in turning of the device in operation. It is appreciated that any turns effected while the cultivation action is in progress tend to cause the frame to pivot about the area of the cultivated shanks rather than the wheels in view of the fact that the cultivated shanks have a much greater grip on the ground. The wheels therefore tend to scrub across the ground during the turning action and the alignment of the gauge wheels with the main wheels reduces the detrimental effect of this scrubbing action.

Figure 10:
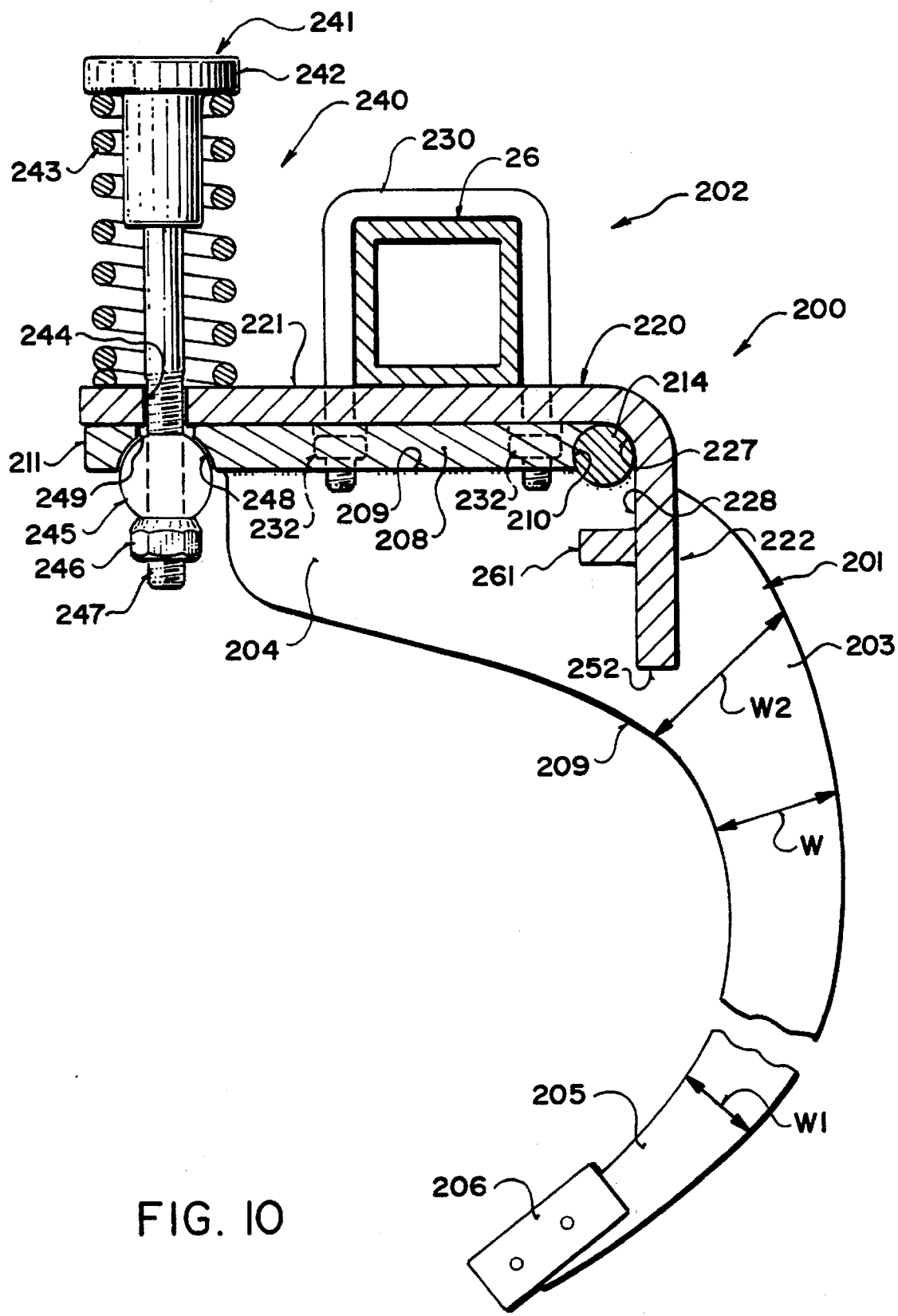
FIG. 10 is a vertical cross-sectional view through a spring trip arrangement for a shank mounted on one of the tool frames of the frame shown in the above figures.
Figure 11:
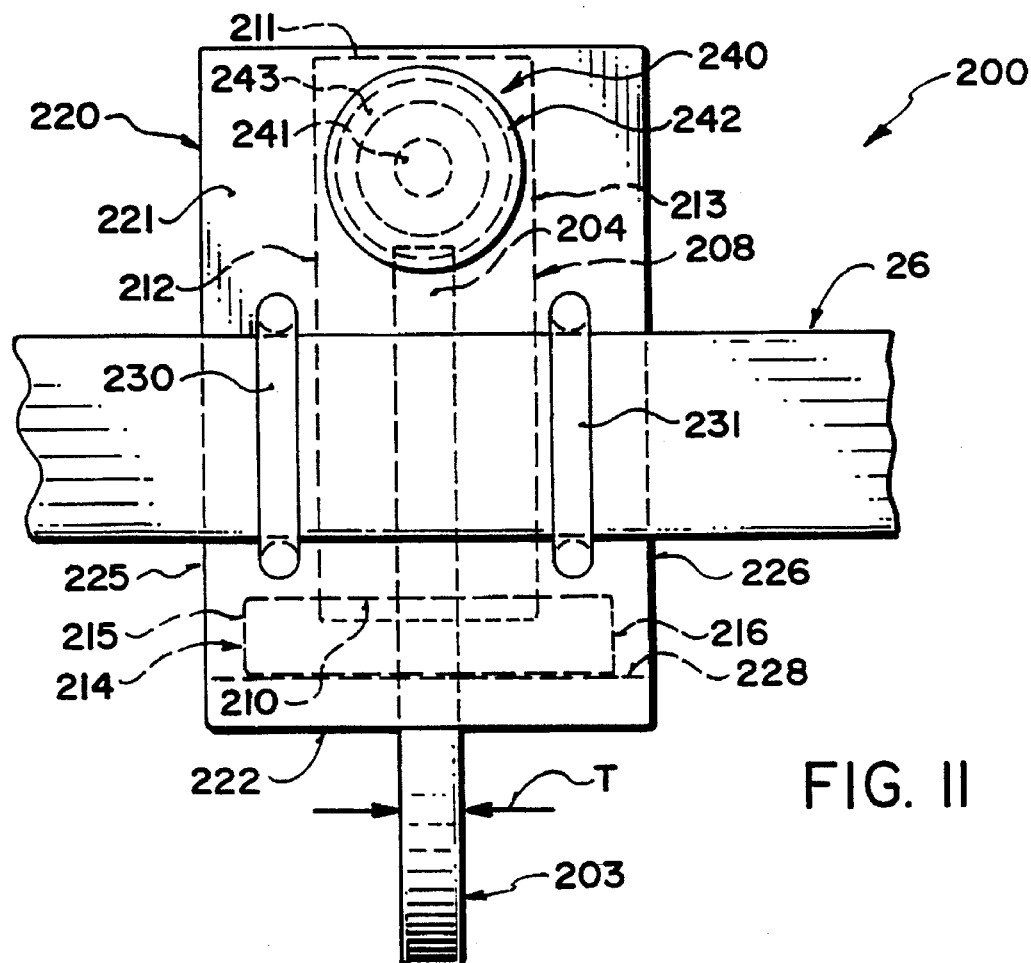
FIG. 11 is a top plan view of the spring trip of FIG. 10.
Figure 12:
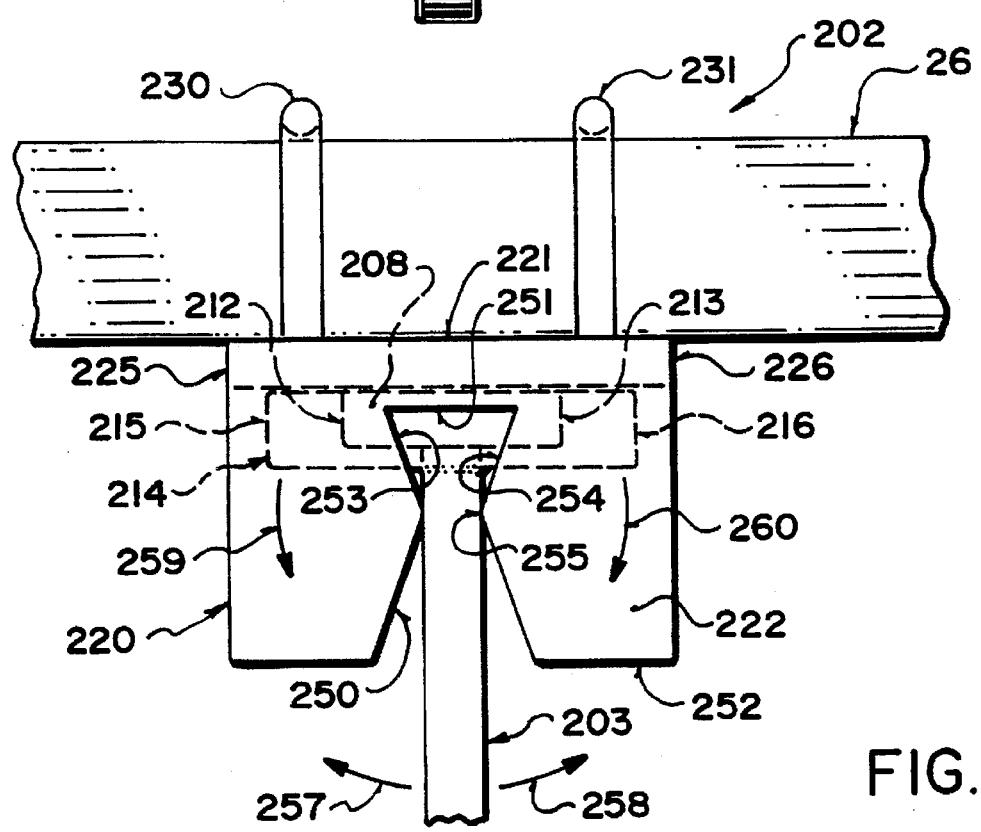
FIG. 12 is a rear elevational view of the spring trip of FIG. 10.

Turning now to the construction of the trip shank arrangement shown in FIGS. 10, 11 and 12, one of the horizontal bars of the tool frame is indicated at 26 on which is mounted a trip shank assembly 200. It will be appreciated that the trip shank assembly forms one of the shanks shown schematically in the previous figures mounted at spaced positions on the tool frame and particularly on the bars 26, 27 and 28.

The trip shank assembly comprises a shank member 201 and a mounting assembly 202. The shank member 201 includes a shank 203 extending from an upper end 204 at the mounting assembly 202 to a lower and 205 carrying a shoe 206 to which is attached the ground working tool generally in the form of a sweep having a point and wings. However the shoe is designed so that the sweep can be removed and replaced by other types of tool which can be of the knock-on or bolt on type as required.

The shank 203 is cut from a plate of metal so that it has a width W in the longitudinal direction or direction of movement which is greater than the thickness T transverse to the longitudinal direction. The use of flame cutting processes allows the shank to be cut to any required shape and in particular the inner surface 207 of the generally C-shaped shank can be shaped to a required configuration to control the movement of trash onto and past the inner surface 207. The thickness of the plate is selected to provide sufficient strength and is generally of the order of 0.5 to 0.075 inch. This relatively narrow shank structure in the thickness T direction allows the shank to move more readily through the soil and through the trash. The strength and structure of the shank can thus be selected by determining the width W of the shank which varies along the length from a relatively narrow part W1 at the lower end to a wider part W2 toward the upper end.

The shank member further includes a plate 208 which is welded across a top surface 209 of the shank at the upper end generally at right angles to the vertical plane of the shank. The plate 208 has a rear edge 210, a front edge 211 and side edges 212 and 213. The plate is generally rectangular and has a width between the side edges 212 and 213 which is greater than the thickness T of the shank.

Across the rear edge 210 is welded a rod 214 which thus lies at right angles to the vertical plane of the shank and projects outwardly to ends 215 and 216 of the rod each of which lies at a position spaced outwardly from a respective side of the shank 203.

The mounting assembly 202 comprises a main plate 220 which is a main horizontal portion 221 and a vertical rear downturn portion 222. The plate 220 has a length slightly greater than the length of the plate 208 and a width between sides 225 and 226 which is greater than the width of the plate 208 so that portions of the plate 220 overhang or extend beyond the edges 212 and 213 of the plate 208.

The plate 220 is clamped to the bar 226 by a pair of U-shaped clamp elements 230 and 231 each of which engages over the bar 26 and passes through holes in the plate 220 so that threaded ends of the U-shaped clamp are bolted to the underside of the plate 220 by nuts 232.

The downturned portion 222 is formed by bending the plate 220 so as to form a curved inner surface 227 at the junction between the horizontal portion 221 and the vertical downturned portion 222. This curved inner surface 227 is arranged to receive the outside circumference of the rod 214 cupped in the curved surface 227. The downturned portion 222 has a front facing surface 228 contiguous with the curved surface 227 which thus acts to apply a forward force to the rod 214 so that the forward force from the frame bar 26 is communicated through the mounting plate 220 into the rod 214 and thus to the shank member 201.

The plate 208 is clamped upwards into engagement with the undersurface of the mounting plate 220 by a trip spring 240. The trip spring 240 includes a support rod 241 with a top cap 242 against which a top of a spring 243 engages so as to compress the spring downwardly against a top surface of the plate 220. The rod passes through the interior of the spring 243 and through a hole 244 in the plate 220 into a bowl 245 which is held in place on the rod by a nut 246 engaging a threaded section 247 of the rod 241. The bowl 245 engages into a recess 248 in the surface 209 of the plate 208. The recess 248 is shaped with a curvature approximately following that of the outside surface of the ball 245 so as to allow the plate to twist on the ball and particularly the upper part of the surface of the ball surrounding the rod 241. A hole 249 in the plate 208 at the recess 248 is slightly oversize relative to the rod again to allow twisting of the plate relative to the rod.

The spring 243 thus pushes upwardly on the cap 242 and pulls the rod 241 upwardly to press the bowl into the recess 248 and thus to clamp the plate 208 against the underside of the plate 220. At the same time the rod 214 is pushed upwardly into the surface 227.

In the event of impact of the ground working tool with an obstacle in the field, the shank 203 can pivot rearwardly about the pivot axis defined by the rod 214 by downward movement of the front part of the plate 208. This acts to pull the 245 downwardly thus compressing the spring 243. The trip action in the vertical plane of the shank therefore allows the shank to move directly rearwardly against a predetermined force set by the compression of the spring 243.

In the event that the shank receives a sideways force by engagement of the ground working tool with one side of an obstacle, that sideways movement is obtained by downward movement of one end of the rod 214 by sliding of the rod across the surface 228. The end of the rod 214 opposite to the impact remains in position within the curved surface 227 and up against the undersurface of the plate 220. The pivoting effect therefore occurs about a line joining the end 215 or 216 of the rod 214 and the centre of the rod 241. Again this pivoting action requires the plate 208 to move slightly away from the plate 220 and thus the ball 245 is pulled downwardly from the plate 220 thus again compressing the spring 243. The amount of force necessary however to divert the shank to one side is less than that necessary to allow the shank to move directly rearwardly. Thus there is a tendency for the shank to divert to one side around the obstacle rather than to move directly rearwardly.

Once the tripping action has finished due to the release of the ground working tool from the obstacle, whether this tripping action be directly rearwardly or partly to one side, the spring 243 acts to pull the plate 208 back up underneath the plate 220 and thus to return the rod 214 into its cupped surface 227. In order to control the movement of the shank and to return the shank properly to its initial position, the shank passes through a slot 250 in the vertical portion 222 of the main plate 220. The slot 250 is arranged centrally of the portion 222 and extends from a top edge 251 just below the top of the portion 222 through a bottom edge 252 of the portion 222. The slot is shaped so that each side of the slot indicated respectively at 253 and 254 defines an apex 255 and then diverges away from the other side of the slot. Thus the ends of the slot at the top edge 251 and the bottom edge 252 are of greater width than the width of the slot at the apexes 255.

The width of the slot at the apexes 255 is arranged to be substantially equal to the thickness T of the shank so that the apexes engage the shank and hold the shank against side to side movement of the whole of the shank and the rod 214. However the diverging sides of the rod particularly below the apexes 255 allow the shank to pivot to one side about the aforementioned axis passing through the end 215, 216 of the rod 214. As shown in FIG. 12, therefore, the side to side pivoting movement of the shank as indicated by the arrows 257 and 258 occurs by allowing the adjacent side of the shank to move closer to the diverting sides of the slot 250. The movement of the ends of the rod 214 is shown at arrows 259, 260.

In some cases it may be desirable to limit the amount of downward movement of the rod 214 at its ends 215 and 216 and this can be achieved by providing an abutment 261 on the inside surface 228 of the downturned portion 222. Shown in FIG. 10 only.

The arrangement described above therefore provides an effective pulling force on the shank to provide the necessary forward movement of the shank while at the same time allowing the shank to trip both rearwardly and side to side. At the same time the shank is properly centered when it returns to initial position so that the shank is held properly in its required vertical operating plane by the location of the rod in the cupping support surface. The manufacture of the shank which is cut from the plate allows the shank to have a relatively narrow thickness providing an improved movement through the soil and trash while providing sufficient strength for the shank in the longitudinal direction and allowing the inside surface of the shank to be shaped to properly control the movement of the trash and to prevent collection of the trash.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A trip shank for mounting a ground working element comprising:

a shank member having an elongate curved shank and a mounting shoe at a lower end of the shank for removably receiving the ground working element thereon;

a mounting member for receiving and supporting the shank member;

a clamp assembly for attachment of the mounting member to a tool bar for supporting the shank and mounting shoe at a position at the ground;

the shank member having thereon a transverse engagement element adjacent an upper end thereof and extending outwardly to each side of the shank;

the mounting member comprising a body defining a downwardly facing bottom engagement surface for engaging and locating the upper end of the shank member;

the body including a rear downturned portion such that a shank engagement surface of the downturned portion faces forwardly;

the downturned portion including a slot therein through which the shank passes, each side of the slot being shaped to engage the shank to prevent side to side shifting of the shank while allowing twisting of the shank about a trip axis extending generally in a forward direction;

a spring applying a force to the shank member to move to a position in which the upper end of the shank member is in contact with the bottom engagement surface and the transverse engagement element is in contact with the shank engagement surface of the downturned portion to allow forward movement of the mounting member to apply a forward pulling force to the shank member;

the shank member and the mounting member being shaped to allow a sideways force on the shank caused by impact with an obstacle to cause downward movement of one side of the transverse engagement element relative to the engagement surface of the downturned portion to allow sideways tripping movement of the shank by twisting movement about said trip axis.

2. The trip shank according to claim 1 wherein the shank is shaped so that its width in a direction transverse to the forward direction is less than its depth in the forward direction.

3. The trip shank according to claim 1 wherein the shank is shaped so that its depth in the forward direction varies along the length of the shank.

4. The trip shank according to claim 1 wherein the shank member includes a plate at the upper end welded to the shank and having an upper surface lying in contact with the bottom engagement surface.

5. The trip shank according to claim 1 wherein the transverse engagement element comprises a rod welded to a rear face of the shank.

6. The trip shank according to claim 1 wherein the shank member includes a plate at the upper end welded to the shank and having an upper surface lying in contact with the bottom engagement surface and wherein the transverse engagement element comprises a rod welded to the shank member at a rear face of the plate.

7. The trip shank according to claim 1 wherein the spring comprises a compression spring mounted on top of the body and having a pull rod attached to an upper end of the spring extending through an opening in the body into engagement with the upper end of the shank member.

8. The trip shank according to claim 7 including a ball at a bottom end of the pull rod engaging into a recess in the shank member and allowing said twisting movement of the shank member about said trip axis.

9. The trip shank according to claim 1 wherein each side of the slot includes an apex abutting an adjacent side of the shank and two side portions each on a respective side of the apex diverging away from the shank.

10. An agricultural machine comprising:

a tool bar assembly including an elongate tool bar having a longitudinal axis;

a plurality of tool frames mounted on the tool bar at longitudinally spaced positions therealong;

a plurality of ground working elements mounted on each tool frame;

the tool bar including a center section, two wing sections and pivot coupling means connecting an inner end of each wing section to a respective one of two outer ends of the center section;

a plurality of ground wheels for supporting the center section and the wing sections, the center section having at least two ground wheels spaced longitudinally thereof and each wing section having at least one ground wheel at a position thereon spaced outwardly of said inner end thereof;

a hitch frame having a hitch for attachment to a towing vehicle;

connecting means for connecting the hitch frame to the tool bar assembly for transporting the tool bar assembly, the tool frames and the ground working elements across the ground;

means providing pivotal movement of the elongate tool bar relative to the hitch frame about a pivot axis between a first operating position, in which the center section and wing sections are substantially coaxial and in which the tool frames trail generally rearwardly from the elongate tool bar, and a second transport position in which the elongate tool bar is rotated through an angle to raise the tool frames to an orientation generally upwardly from the elongate tool bar;

said pivot coupling means being arranged, in the first operating position, to allow the outer ends of the wing sections to move upwardly and downwardly relative to the center section and, in the second transport position, to allow the wing sections to move rearwardly to a trailing position;

each tool frame comprising a plurality of parallel bars and a pair of longitudinal rails, the bars lying parallel to the tool bar and each bar having thereon a plurality of said ground working elements;

the tool bar having for each tool frame a tool frame engagement means allowing individual pivotal movement of each tool frame independently of the other tool frames and including a pair of forwardly extending, transversely spaced arms connected to the tool bar for pivotal movement about a tool frame axis parallel to the tool bar;

each ground working element including a trip shank for mounting the ground working element on the tool frame comprising:

a shank member having an elongate curved shank and a mounting shoe at a lower end of the shank for removably receiving the ground working element thereon;

a mounting member for receiving and supporting the shank member;

a clamp assembly for attachment of the mounting member to a bar of the respective tool frame for supporting the shank and mounting shoe at a position at the ground;

the shank member having thereon a transverse engagement element adjacent an upper end thereof and extending outwardly to each side of the shank;

the mounting member comprising a body defining a downwardly facing bottom engagement surface for engaging and locating the upper end of the shank member;

the body including a rear downturned portion such that a shank engagement surface of the downturned portion faces forwardly;

the downturned portion including a slot therein through which the shank passes, each side of the slot being shaped to engage the shank to prevent side to side shifting of the shank while allowing twisting of the shank about a trip axis extending generally in a forward direction;

a spring applying a force to the shank member to move to a position in which the upper end of the shank member is in contact with the bottom engagement surface and the transverse engagement element is in contact with the shank engagement surface of the downturned portion to allow forward movement of the mounting member to apply a forward pulling force to the shank member;

the shank member and the mounting member being shaped to allow a sideways force on the shank caused by impact with an obstacle to cause downward movement of one side of the transverse engagement element relative to the engagement surface of the downturned portion to allow sideways tripping movement of the shank by twisting movement about said trip axis.

11. The agricultural machine according to claim 10 wherein the shank is shaped so that its width in a direction transverse to the forward direction is less than its depth in the forward direction.

12. The agricultural machine according to claim 10 wherein the shank is shaped so that its depth in the forward direction varies along the length of the shank.

13. The agricultural machine according to claim 10 wherein the shank member includes a plate at the upper end welded to the shank and having an upper surface lying in contact with the bottom engagement surface.

14. The agricultural machine according to claim 10 wherein the transverse engagement element comprises a rod welded to a rear face of the shank.

15. The agricultural machine according to claim 10 wherein the shank member includes a plate at the upper end welded to the shank and having an upper surface lying in contact with the bottom engagement surface and wherein the transverse engagement element comprises a rod welded to the shank member at a rear face of the plate.

16. The agricultural machine according to claim 10 wherein the spring comprises a compression spring mounted on top of the body and having a pull rod attached to an upper end of the spring extending through an opening in the body into engagement with the upper end of the shank member.

17. The agricultural machine according to claim 16 including a ball at a bottom end of the pull rod engaging into a recess in the shank member and allowing said twisting movement of the shank member about said trip axis.

18. The agricultural machine according to claim 10 wherein each side of the slot includes an apex abutting an adjacent side of the shank and two side portions each on a respective side of the apex diverging away from the shank.

19. An agricultural machine comprising:

a tool bar assembly including an elongate tool bar having a longitudinal axis;

a plurality of tool frames mounted on the tool bar at longitudinally spaced positions therealong;

a plurality of ground working elements mounted on each tool frame;

the tool bar including a center section, two wing sections and pivot coupling means connecting an inner end of each wing section to a respective one of two outer ends of the center section;

the tool bar assembly including a plurality of ground wheels for supporting the center section and the wing sections, the center section having at least two ground wheels spaced longitudinally thereof and each wing section having at least one ground wheel at a position thereon spaced outwardly of said inner end thereof;

the tool bar assembly including brace means connecting each ground wheel to the elongate tool bar such that each ground wheel has an axis of rotation parallel to said longitudinal axis of the elongate tool bar and spaced therefrom;

the brace means being arranged such that when the center section and the wing sections of the elongate tool bar are coaxial the axes of the ground wheels lie on a common line;

a hitch frame having a hitch for attachment to a towing vehicle;

connecting means for connecting the hitch frame to the tool bar assembly for transporting the tool bar assembly, the tool frames and the ground working elements across the ground;

the connecting means including pivot mounting means providing pivotal movement of the tool bar assembly including the center section and wing sections of the elongate tool bar together with the brace means and ground wheels carried thereby relative to the hitch frame about a pivot axis parallel to said common line;

actuator means for effecting said pivotal movement of the tool bar assembly about said pivot axis between a first operating position, in which the center section and wing sections of the elongate tool bar are substantially coaxial, in which the common line of the ground wheels is located forwardly of the longitudinal axis of the elongate tool bar, in which the tool frames trail generally rearwardly from the elongate tool bar and in which said pivotal movement causes a change in height of the elongate tool bar relative to the common line, and a second transport position in which the common line of the ground wheels is moved rearwardly relative to the elongate tool bar and in which the elongate tool bar is rotated through an angle to raise the tool frames to an orientation generally upwardly from the elongate tool bar;

said pivot coupling means being arranged, in the first operating position, to allow the outer ends of the wing sections to move upwardly and downwardly relative to the center section and, in the second transport position, to allow the wing sections to move rearwardly to a trailing position;

the connecting means connecting the hitch frame to the brace means of the center section of the elongate tool bar;

the pivot mounting means being arranged such that the pivot axis is parallel to and offset from the longitudinal axis of the elongate tool bar and parallel to and offset from the common line;

and a mechanical stop member which is located between the hitch frame and the brace means for locating the brace means in the first operating position relative to the hitch frame so as to set a height of the tool bar, the mechanical stop means comprising a wedge member slidable longitudinally of the hitch frame.

20. An agricultural machine comprising:

a tool bar assembly including an elongate tool bar having a longitudinal axis;

a plurality of tool frames mounted on the tool bar at longitudinally spaced positions therealong;

a plurality of cultivator shanks mounted on each tool frame, each having a ground cutting tool attached thereto at a lower end thereof and having a front point for engaging under a top surface of the ground in a cutting action;

each shank including a spring trip mechanism and having a generally C-shape extending from the trip mechanism to the cutting tool;

the tool bar including a center section, two wing sections and pivot coupling means connecting an inner end of each wing section to a respective one of two outer ends of the center section;

a plurality of ground wheels for supporting the center section and the wing sections, the center section having at least two ground wheels spaced longitudinally thereof and each wing section having at least one ground wheel at a position thereon spaced outwardly of said inner end thereof;

a hitch frame having a hitch for attachment to a towing vehicle;

connecting means for connecting the hitch frame to the tool bar assembly for transporting the tool bar assembly, the tool frames and the ground working elements across the ground;

each tool frame comprising a plurality of parallel bars and a pair of longitudinal rails, the bars lying parallel to the tool bar and each bar having thereon a plurality of said shanks;

the tool bar having for each tool frame a tool frame engagement means allowing individual pivotal movement of each tool frame independently of the other tool frames and including a pair of forwardly extending, transversely spaced arms connected to the tool bar for pivotal movement about a tool frame axis parallel to the tool bar;

the tool bar having for each tool frame spring biasing means connected between the tool bar and the tool frame at a position on the tool frame rearwardly of said tool frame axis for applying downward pressure on the tool frame;

said pivot mounting means being arranged such that rotation of the elongate tool bar about the pivot axis rotates the spring biasing means in a direction to increase said downward pressure;

said spring biasing means comprising an elongate spring bar with a forward end clamped to the tool bar and a rearward end engaging an abutment member on the tool frame.

21. The agricultural machine according to claim 20 wherein the abutment member includes a pair of side plates and a pin extending transversely thereacross with the spring bar engaging the pin.

22. The agricultural machine according to claim 21 wherein the bar includes an end portion turned at right angle thereto for pulling on the pin when the tool bar is turned in a direction to lift the tool frame.

23. The agricultural machine according to claim 21 wherein the height of the pin on the plates is adjustable.

* * * * *